United States Patent
Januszewski

(10) Patent No.: US 12,155,713 B2
(45) Date of Patent: *Nov. 26, 2024

(54) METHODS, SYSTEMS, AND MEDIA FOR RESUMING PLAYBACK OF MEDIA CONTENT ACROSS MULTIPLE DEVICES

(71) Applicant: Google LLC, Mountain View, CA (US)

(72) Inventor: Michal Januszewski, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,847

(22) Filed: Aug. 28, 2023

(65) Prior Publication Data

US 2023/0403316 A1 Dec. 14, 2023

Related U.S. Application Data

(63) Continuation of application No. 17/101,407, filed on Nov. 23, 2020, now Pat. No. 11,743,315, which is a
(Continued)

(51) Int. Cl.
*H04L 65/75* (2022.01)
*H04L 43/0876* (2022.01)
*H04L 67/146* (2022.01)
*H04L 67/306* (2022.01)
*H04L 67/02* (2022.01)
*H04N 21/45* (2011.01)
(Continued)

(52) U.S. Cl.
CPC .......... *H04L 65/75* (2022.05); *H04L 43/0876* (2013.01); *H04L 67/146* (2013.01); *H04L 67/306* (2013.01); *H04L 67/02* (2013.01); *H04N 21/4532* (2013.01); *H04N 21/47217* (2013.01); *H04N 21/8456* (2013.01)

(58) Field of Classification Search
CPC ... H04L 65/75; H04L 43/0876; H04L 67/146; H04L 67/306; H04L 67/02; H04N 21/47217; H04N 21/8456
See application file for complete search history.

(56) References Cited

U.S. PATENT DOCUMENTS 7,620,301 B2 11/2009 Kim et al.
8,197,345 B2 6/2012 Godfrey et al.
(Continued)

OTHER PUBLICATIONS

Notice of Allowance dated Apr. 11, 2023 in U.S. Appl. No. 17/101,407.
(Continued)

*Primary Examiner* — Viet D Vu
(74) *Attorney, Agent, or Firm* — Shumaker & Sieffert, P.A.

(57) ABSTRACT

Systems and methods for facilitating cross device resumable media content consumption. In an aspect, a system includes an update component that receives a media statistics update where the media statistics update includes information identifying an account, media content identification information, and a first playback time position associated with media content. A monitoring component is also included that identifies when the account accesses the media content associated with the media content identification information. A resume component is also included that plays back the media content at the first playback time position in response to identifying an access of the media content associated with the account.

21 Claims, 11 Drawing Sheets

Related U.S. Application Data continuation of application No. 15/851,171, filed on Dec. 21, 2017, now Pat. No. 10,848,535, which is a continuation of application No. 15/288,913, filed on Oct. 7, 2016, now Pat. No. 9,876,834, which is a continuation of application No. 13/912,517, filed on Jun. 7, 2013, now Pat. No. 9,467,359.

(51) Int. Cl.
*H04N 21/472* (2011.01)
*H04N 21/845* (2011.01)

(56) References Cited

U.S. PATENT DOCUMENTS

| | | | |
|---|---|---|---|
| 9,467,359 B1 | 10/2016 | Januszewski | |
| 9,542,398 B2 | 1/2017 | Yamamoto | |
| 9,876,834 B2 | 1/2018 | Januszewski | |
| 10,225,300 B2 | 3/2019 | Rodriguez et al. | |
| 10,848,535 B2 | 11/2020 | Januszewski | |
| 11,743,315 B2 | 8/2023 | Januszewski | |
| 2003/0170011 A1* | 9/2003 | Otsuka | H04N 21/8586 386/230 |
| 2008/0155615 A1 | 6/2008 | Craner et al. | |
| 2009/0217336 A1 | 8/2009 | Chang et al. | |
| 2009/0222851 A1 | 9/2009 | Talmi | |
| 2010/0027966 A1 | 2/2010 | Harrang et al. | |
| 2010/0144439 A1 | 6/2010 | Watanabe et al. | |
| 2010/0146142 A1 | 6/2010 | Long et al. | |
| 2011/0158606 A1 | 6/2011 | Lin et al. | |
| 2011/0243527 A1 | 10/2011 | Hayashi | |
| 2011/0293252 A1* | 12/2011 | Greenfield | H04N 21/4325 386/350 |
| 2012/0112986 A1 | 5/2012 | McCoy et al. | |
| 2013/0024898 A1 | 1/2013 | Munetsugu et al. | |
| 2013/0051755 A1 | 2/2013 | Brown et al. | |
| 2013/0073449 A1 | 3/2013 | Voynow et al. | |
| 2013/0145016 A1 | 6/2013 | Vantalon et al. | |
| 2013/0174035 A1* | 7/2013 | Grab | H04N 21/4316 715/716 |
| 2013/0198298 A1 | 8/2013 | Li et al. | |
| 2013/0346478 A1 | 12/2013 | Rodriguez et al. | |
| 2014/0201767 A1 | 7/2014 | Seiden et al. | |
| 2014/0237525 A1 | 8/2014 | Rothschild et al. | |
| 2014/0270201 A1* | 9/2014 | Kocalar | H04R 1/1041 381/58 |
| 2014/0282755 A1 | 9/2014 | Alsina et al. | |
| 2021/0311698 A1 | 10/2021 | Vega-Zayas et al. | |

OTHER PUBLICATIONS

Notice of Allowance dated Jun. 7, 2016 in U.S. Appl. No. 13/912,517.
Notice of Allowance dated Jul. 21, 2020 in U.S. Appl. No. 15/851,171.
Notice of Allowance dated Oct. 25, 2017 in U.S. Appl. No. 15/288,913.
Office Action dated Feb. 3, 2023 in U.S. Appl. No. 17/101,407.
Office Action dated Feb. 4, 2020 in U.S. Appl. No. 15/851,171.
Office Action dated Feb. 15, 2019 in U.S. Appl. No. 15/851,171.
Office Action dated Mar. 4, 2022 in U.S. Appl. No. 17/101,407.
Office Action dated Mar. 20, 2017 in U.S. Appl. No. 15/288,913.
Office Action dated May 13, 2021 in U.S. Appl. No. 17/101,407.
Office Action dated Jun. 14, 2019 in U.S. Appl. No. 15/851,171.
Office Action dated Jun. 16, 2022 in U.S. Appl. No. 17/101,407.
Office Action dated Jul. 28, 2017 in U.S. Appl. No. 15/288,913.
Office Action dated Sep. 10, 2021 in U.S. Appl. No. 17/101,407.
Office Action dated Oct. 13, 2022 in U.S. Appl. No. 17/101,407.
Office Action dated Oct. 22, 2019 in U.S. Appl. No. 15/851,171.
Office Action dated Dec. 14, 2015 in U.S. Appl. No. 13/912,517.
Prosecution History from U.S. Appl. No. 13/912,517, now issued U.S. Pat. No. 9,467,359, dated Dec. 14, 2015 through Jun. 7, 2016, 30 pp.
Prosecution History from U.S. Appl. No. 15/288,913, now issued U.S. Pat. No. 9,876,834, dated Mar. 20, 2017 through Oct. 25, 2017, 60 pp.
Prosecution History from U.S. Appl. No. 15/851,171, now issued U.S. Pat. No. 10,848,535, dated Feb. 15, 2019 through Jul. 21, 2020, 90 pp.
Prosecution History from U.S. Appl. No. 17/101,407, now issued U.S. Pat. No. 11,743,315, dated May 13, 2021 through Apr. 11, 2023, 146 pp.

\* cited by examiner

METHODS, SYSTEMS, AND MEDIA FOR RESUMING PLAYBACK OF MEDIA CONTENT ACROSS MULTIPLE DEVICES

CROSS-REFERENCE TO RELATED APPLICATIONS

This application is a continuation of U.S. patent application Ser. No. 17/101,407, filed Nov. 23, 2020, now U.S. Pat. No. 11,743,315, which is a continuation of U.S. patent application Ser. No. 15/851,171, filed Dec. 21, 2017, now U.S. Pat. No. 10,848,535, which is a continuation of U.S. patent application Ser. No. 15/288,913, filed Oct. 7, 2016, now U.S. Pat. No. 9,876,834, which is a continuation of U.S. patent application Ser. No. 13/912,517, filed Jun. 7, 2013, now U.S. Pat. No. 9,467,359, each of which is hereby incorporated by reference herein in its entirety.

TECHNICAL FIELD

This disclosure relates to system(s) and method(s) that facilitate resuming media content playback across multiple devices.

BACKGROUND

As the numbers of Internet connected devices grow, it is not uncommon for one person to have a desktop, laptop, mobile device, and/or tablet in their possession, and to switch frequently between them as they change environments. When a user starts viewing a video, listening to an audio file, or consuming another form of media on one device, it is useful to be able to resume the media on another device. This is particularly useful in the case of streaming long-form linear content such as video, audio, or ordered collections of shorter form pieces (e.g., playlists of audio/video files). Current resuming systems require a shutdown procedure which saves or bookmarks the last known position of the media.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope of the particular aspects of the disclosure, or any scope of the claims. Its sole purpose is to present some concepts of the specification in a simplified form as a prelude to the more detailed description that is presented in this disclosure.

In accordance with an aspect, an update component receives media statistics update information periodically, wherein the information includes identification of a user account, media content identification information, and a first playback time position. A monitoring component is also included that identifies when media content associated with the media content identification information is accessed. A resume component is also included that delivers the media content at the first playback time position in response to the identifying by the monitoring component.

Also disclosed herein is a method including receiving a media statistics update at predefined intervals, where the media statistics update includes information identifying a user account, media content identification information, and a first playback time position associated with media content identified by the media content identification information. The method further includes receiving a notification that the user account is playing back the media content and providing the media content at the first playback time position identified in the media statistics update.

Further disclosed herein is a system that includes a request component that generates an access request to media content on a server, wherein the access request is associated with a user account and includes information identifying the media content. The system also includes a retrieval component that receives playback time position information for the media content, where the playback time position information for the media content, wherein the playback time position information includes information identifying a first playback time position in the media content for the user account. Also included is a playback component that sends a request to the server to resume the media content on a first device at the first playback time position.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Figure 1:
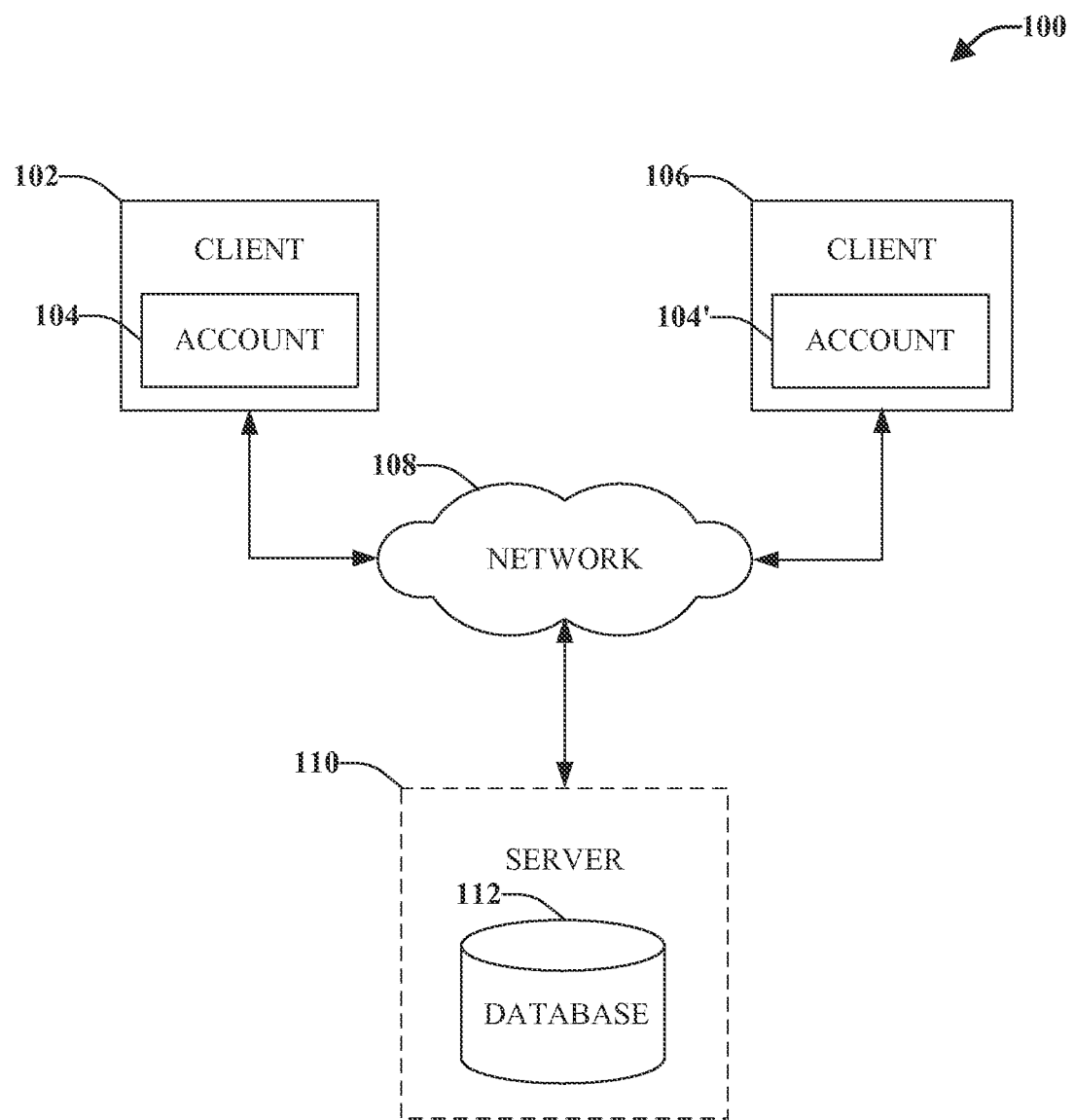
FIG. 1 illustrates a block diagram of an example system that facilitates cross device resumable media consumption in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods that facilitate resumable media content consumption across multiple devices. In an aspect, the system allows smoothly moving between various devices, for instance, starting to watch a video on a desktop, and then leaving the desktop and continue watching the video on a mobile phone on your way home and then later on a tablet without having to save or bookmark your spot or opening the video and seeking to the last known position.

In various embodiments disclosed herein, the last known playback position in various forms of media can be saved in the cloud, external to the device. In this way, a central place to save the last known point within a video/audio/playlist is provided. In one embodiment, periodic pings and/or updates are sent to a server indicating the current playback time, and the last known playback time per content item is saved. In another embodiment, the last known playback time, saved in a cookie, can be sent to a server when the app/browser is closed or re-opened. It is also possible to use a combination of both the above embodiments, since the cookie provides an accurate last known position since the position is saved when the browser or video is stopped, and receiving playback times from the periodic pings work even in the case of crashes, Internet connectivity loss, and similar events. The media can be resumed, based on either the cookie or the periodic ping, at whichever playback time position is later.

In an embodiment, the playback time is provided periodically in response to a ping from a server. In other embodiments, the playback time can be piggy-backed on a video statistics ping which is sent at regular intervals to the media server. The playback time update can also include the media content ID as well as information about the account which is associated with the media content access.

Referring now to the drawings, with reference initially to FIG. 1, a block diagram of an example system 100 that facilitates cross device resumable media consumption in accordance with various aspects and embodiments described herein is shown.

System 100 includes a first client device 102 that streams or otherwise plays back media from a server 110 over a network 108. At regular intervals, client device 102 can send media statistics updates to server 110. The media statistics updates can include information identifying the media that is being consumed or played back (e.g., content ID) on client device 102 as well as information identifying the client device 102 and an account 104 that is logged in on client device 102 and is associated with the media content consumption. The media statistics update can also include playback time position information specifying the current time position of the media at the time the playback time position information is collected from the client device 102. The media statistics update can be received by server 110 and the playback time position information, media content ID and account ID information can be stored in a database 112 on the server 110. The information can be stored in the database 112 for a predetermined period of time such as for 1 month or some other defined period of time. The length of time the information is stored can also be changed based on the bandwidth and storage limitations.

In another embodiment, server 110 pings client device 102 periodically and client device 102 sends the playback time position information in response to the ping. The media statistics update and the pings issued by the server 110 can be sent every 40 seconds or at some other regular time interval.

In an embodiment, the database 112 stores each playback time position update for a month. In another embodiment, the database 112 overwrites each previous update with the latest update for each media content item that is sent from the client 102. In another embodiment, the database 112 overwrites each previous update with the latest update for each media content item that is sent from any client associated with account 104. In this way, the database 112 stores the last known position for the media content item that has been viewed by account 104.

When the user stops viewing/listening to the media on client device 102, and moves to second client device 106, the user can resume watching at the same position or near to the same position the user left off watching on client device 102. In an embodiment, the server 110 can detect when an access request to the media content associated with the media content ID is made and can determine which account is associated with the access request. Upon determining that account 104 is associated with the access request, server 110 can access from the database 112 the last known playback time position for the media content viewed by account 104 and playback the media from that last known time position.

Figure 2:
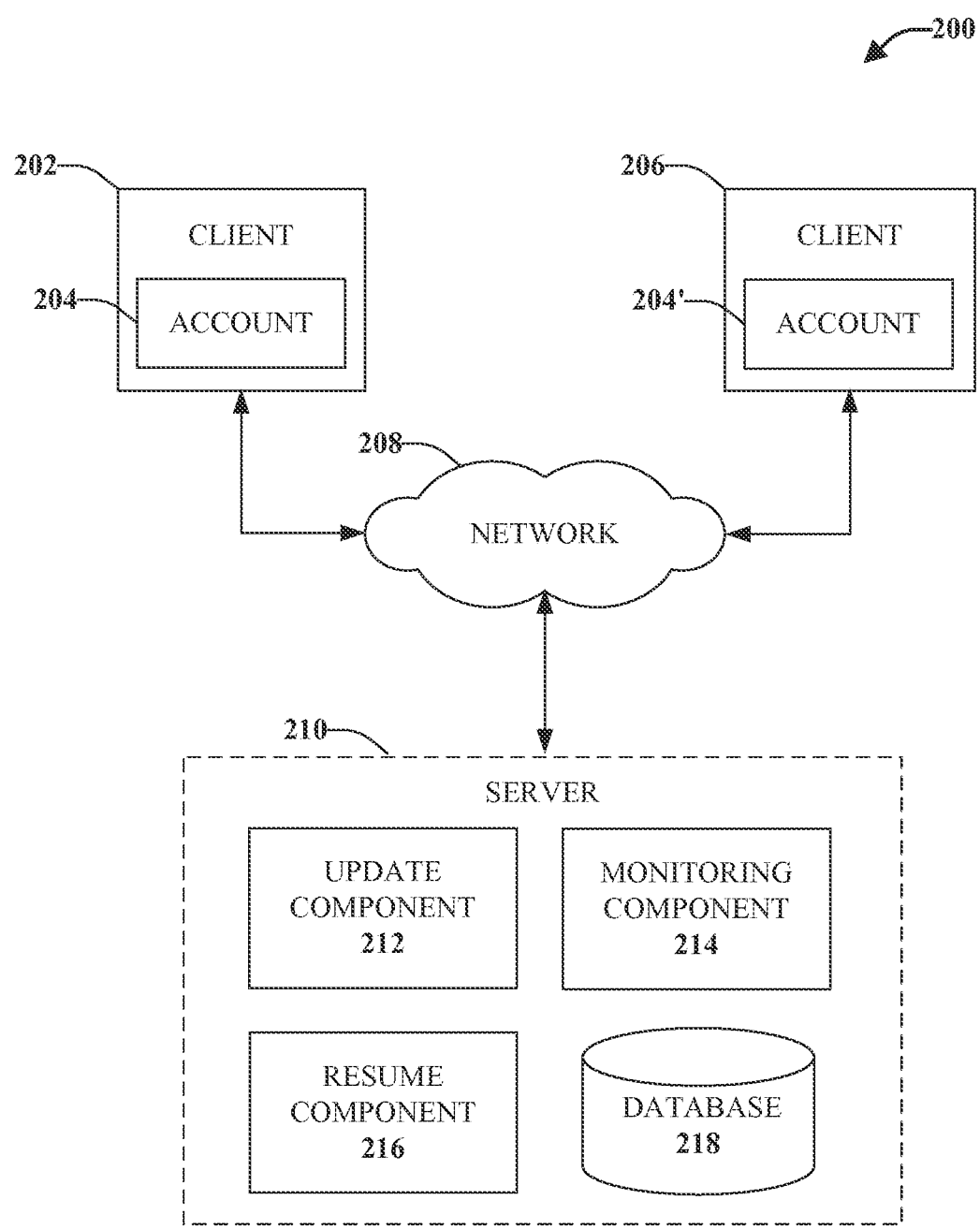
FIG. 2 illustrates a block diagram of an example system that facilitates cross device resumable media consumption in accordance with various aspects and embodiments described herein.

Turning now to FIG. 2, illustrated is a block diagram of an example system 200 that facilitates cross device resumable media consumption in accordance with various aspects and embodiments described herein. System 200 includes a server 210 that facilitates cross device resumable media consumption over a network 208 between client devices 202 and 206. The server 210 includes an update component 212, a monitoring component 214, a resume component 216, and a database 218.

Update component 212 can be configured to receive a media statistics update from client device 202 where the media statistics update includes information identifying an account 204, media content identification information, and a playback time position for the media content. The media statistics update includes information that facilitates smooth and efficient playback of media on client device 202, and the playback time position and other identifying information can be piggybacked on the media statistics update in order to minimize additional bandwidth. The playback time position identifies the time elapsed in the media content at the time the media statistics update is generated.

The monitoring component 214 can be configured to identify when the account 204 accesses the media content associated with the media content identification information. In an embodiment, as shown in FIG. 2, account 204 can access the media content from a different device (e.g., client device 206) from which the account 204 previously played back the media. In other embodiments, account 204 can access the media content from the same device that account 204 previously accessed the media content.

In an embodiment, monitoring component 214 receives a media access request from account 204 and/or client device 206. The media access request can include information identifying the media content that is being requested as well as information identifying the account 204 that is requesting the media access. In some embodiments, the media access request can include an indicator of whether or not the media has been at least partially played back by account 204 before. If there is no indication that the media has been accessed before, resume component 216 can playback the media at the beginning automatically, saving the server 210 from having to search for a last known position.

The resume component 216 can be configured to deliver the media content at the saved playback time position in response to identifying the access of the media content associated with the account 204. The resume component 216 can search for the playback time position in the database 218 by finding any saved playback time positions for the account 204 and the media content. In one embodiment, there can be multiple saved playback time positions for the media content and resume component 216 will deliver, or provide for streaming, the media content at the position that is furthest elapsed from the beginning of the media, regardless of whether the playback time position was saved most recently or not. In another embodiment, the resume component 216 will deliver the media using the playback time position that was most recently received from the account 204, regardless of whether its saved position is the most elapsed or not.

Figure 3:
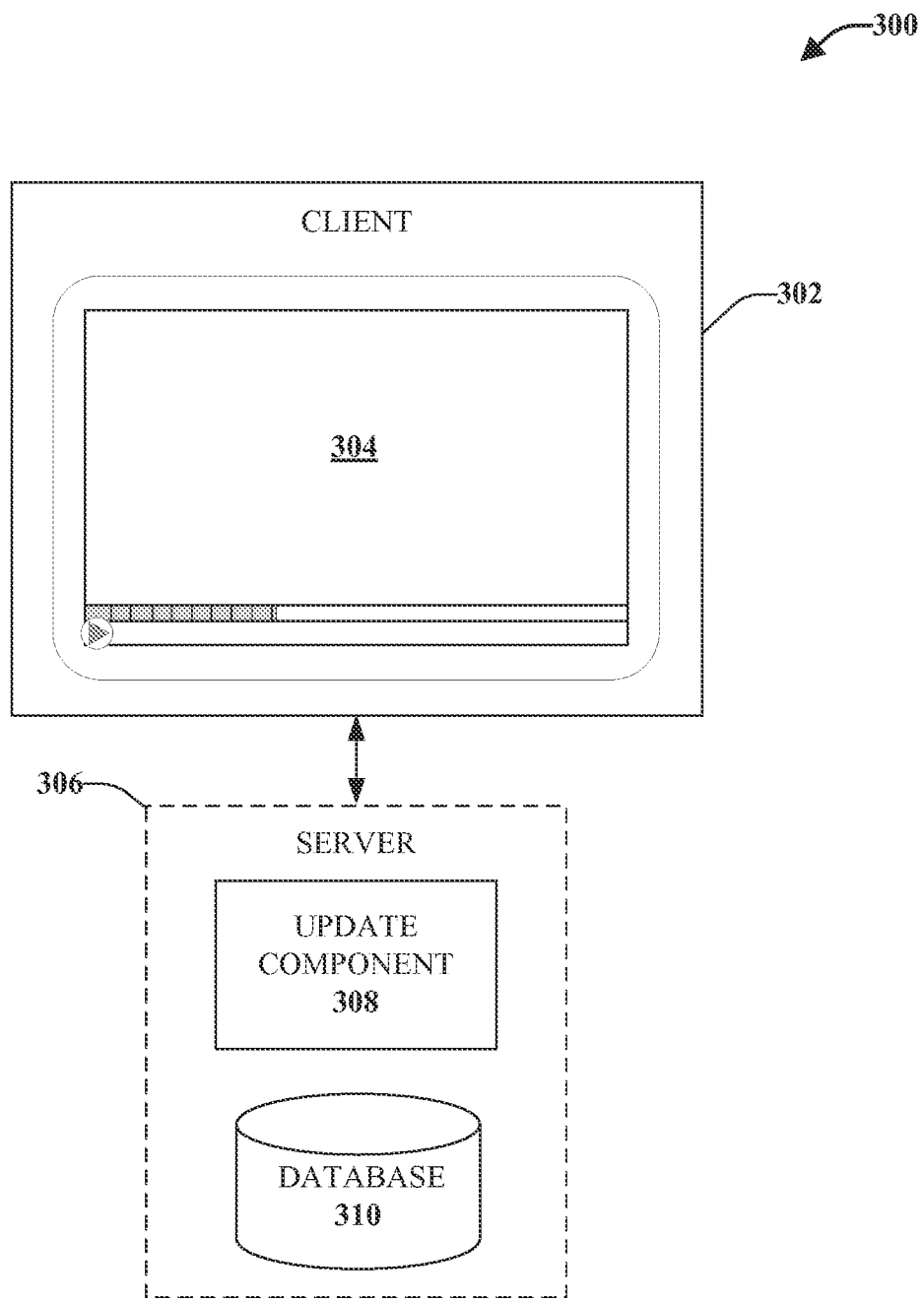
FIG. 3 illustrates a block diagram of an example system that facilitates cross device resumable media consumption in accordance with various aspects and embodiments described herein.

Turning now to FIG. 3, illustrated is a block diagram of an example system 300 that facilitates cross device resumable media consumption in accordance with various aspects and embodiments described herein. System 300 includes an update component 308 on a server 306 that receives playback time position information in a media statistics update from a client device 302 playing back media content 304. The update component 308 stores the playback time position for the media content in a database 310 on server 306.

The media statistics update can be collected by update component 308 at predefined intervals (e.g., every 40 seconds). The intervals can be regular intervals, or the intervals can be varied based on a number of factors. The factors can include bandwidth and storage requirements and/or limitations, user preferences associated with the user account, or based on the length of the media 304 being played back (e.g., shorter media content can have more frequent media statistics updates, while longer media content 304 can have less frequent updates).

In an embodiment, update component 308 issues a ping/media statistics update request to client device 302, and client device 302 sends the playback time position and associated identifying information in response to receiving the ping from update component 308.

The update component 308 stores each playback time position update for a predetermined period of time. In another embodiment, the update component 308 overwrites each previous update with the latest update for each media content item that is sent from the client 302. In another embodiment, the update component 308 overwrites each previous update with the latest update for each media content items that is sent from any client associated with the user account. In this way, the update component 308 stores the last known position for the media content item 304 that has been viewed by the user account.

Figure 4:
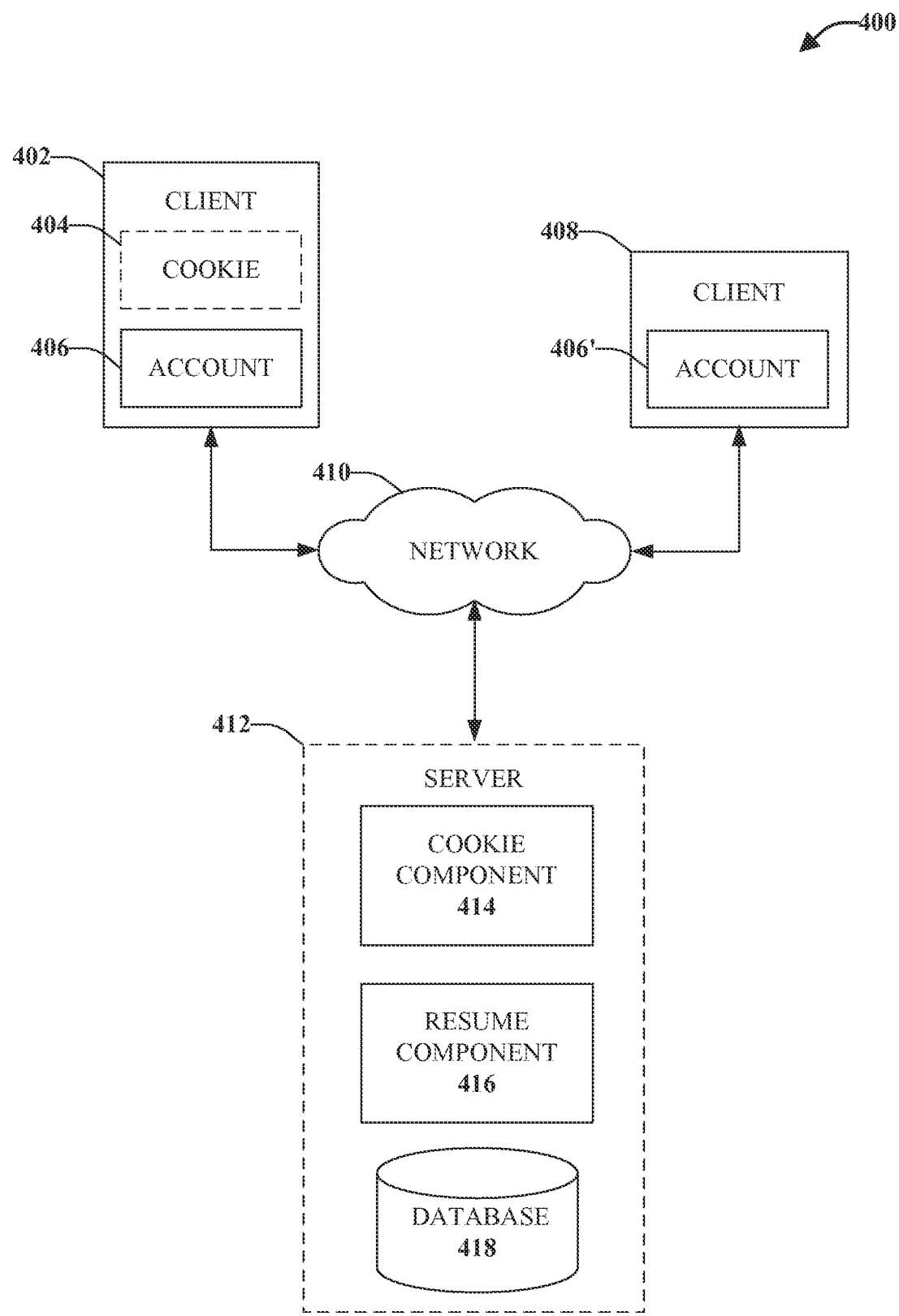
FIG. 4 illustrates a block diagram of an example system that facilitates cross device resumable media consumption in accordance with various aspects and embodiments described herein.

With reference to FIG. 4, a block diagram of an example system 400 that facilitates cross device resumable media consumption in accordance with various aspects and embodiments described herein is shown. System 400 includes a server 412 that facilitates the resumption of media content over a network 410 between client device 402 and client device 408. The server 412 includes a cookie component 414, a resume component 416 and a database 418.

The cookie component 414 is configured to receive a cookie 404 from client device 402, wherein the cookie is associated with account 406 and includes media content identification information and a playback time position. The cookie 404 is generated by the client device 402 and/or the account 406 when the playback time position is saved by the user, or when the media is stopped or paused while being viewed on client device 402 or when the browser is closed on client device 402.

In some embodiments, the client device 402 can send both the media statistics updates with a first playback time position in response to pings from an update component (e.g., 212, 308) as well as cookies with a second playback time position. The first playback time position is received at regular intervals and automatically, whereas the second playback time position is received when the media content is stopped or the browser is shut down. Therefore as long as the media content was stopped in a normal manner, the second playback time position stored in the cookie 404 is most likely the playback time position that is most elapsed. However, in the case of crashes, lost power, or other events which can interrupt the cookie saving process, the first playback time position received from the media statistics update may be the most elapsed position.

When a monitoring component (e.g., monitoring component 214) detects that a client device 408 associated with account 406 is trying to access the media content with the saved playback time positions, resume component 416 will search the database for the most recent playback time position. The resume component 416 will deliver the media for client 408 at the first playback time position (from the media statistics update) in response to the first playback time position being later than the second playback time position, and will provide the media at the second playback time position (from the cookie 404) in response to the second playback time position being later than the first playback time position.

In an embodiment, cookie component 414 will determine whether client device 408 has any stored cookies with playback time position for the media content in response to detecting that client device 408 is trying to access the media content. This can happen in cases that a user is returning to client device 408 after previously watching the media content on client device 408 and other devices. Cookie component 414 can send a request to client device 408 for cookies and if there are cookies, resume component 416 can determine which playback time position is latest, and provide the media from the latest saved playback time position.

Figure 5:
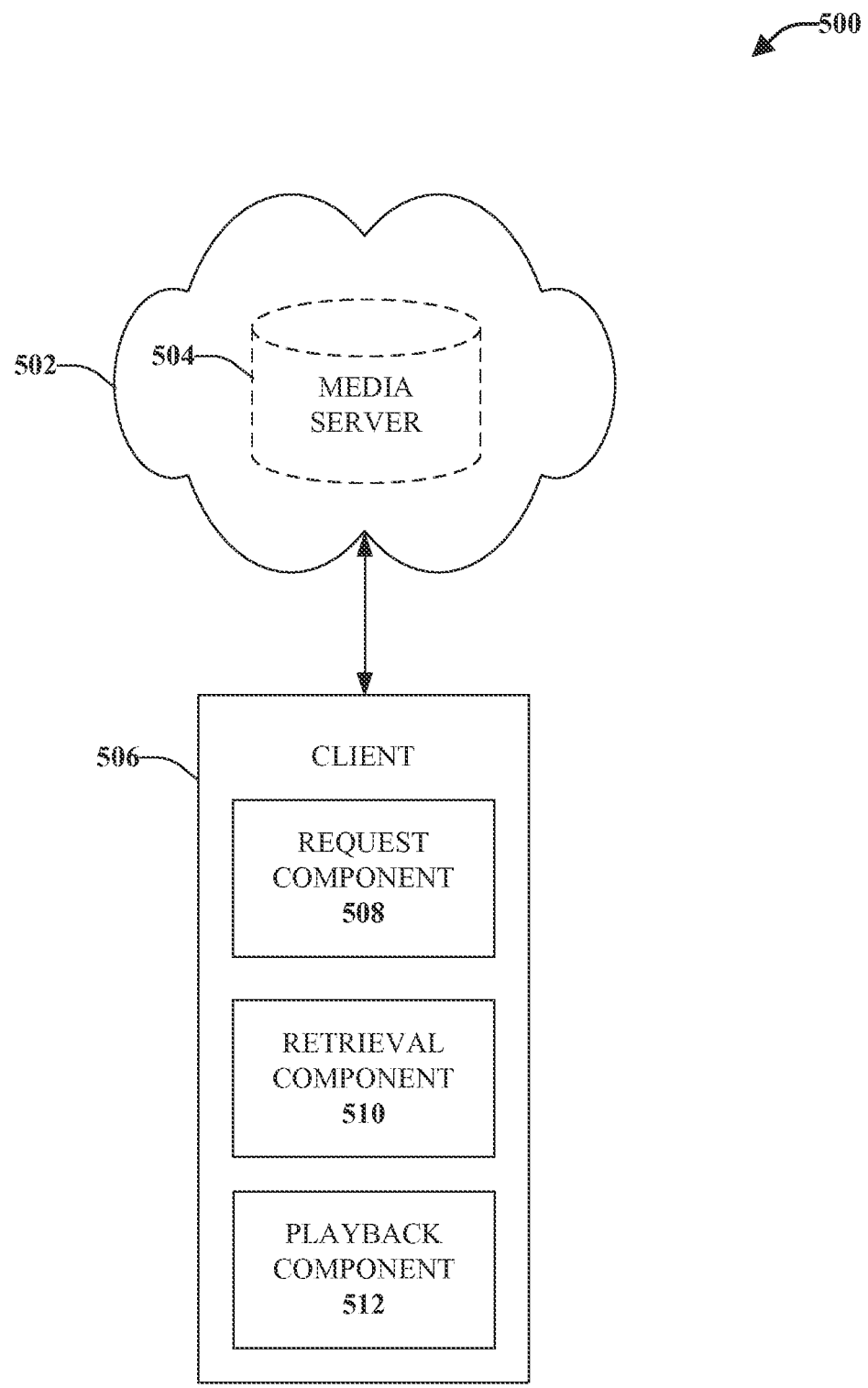
FIG. 5 illustrates a block diagram of an example system that facilitates cross device resumable media consumption in accordance with various aspects and embodiments described herein.

Turning now to FIG. 5, a block diagram illustrates an example system 500 that facilitates cross device resumable media consumption in accordance with various aspects and embodiments described herein. System 500 includes a client device 506 that resumes playback of previously watched media content from a media server 504 via a network 502. The client device 506 includes a request component 508, a retrieval component 510, and a playback component 512.

The request component 508 is configured to generate an access request to media content on the media server 504, where the access request is associated with an account and contains information identifying the media content. The retrieval component 510 is configured to receive playback time position information for the media content from the media server 504, where the playback time position information includes information identifying a first playback time position in the media content for the account.

In an embodiment, the first playback time position retrieved by the retrieval component 510 is based on playback time position information received by the media server from a client device in the form of a media statistics update. The media statistics update can be from client 506 or another client device that viewed the media content and which the account was logged in on.

Once the first playback time position is received by the retrieval component 510, playback component 512 sends a request to the media server 504 to resume the media content on client device 506 at the first playback time position. In another embodiment, playback component 512 forwards through the media to the first playback time position and resumes the media from that position.

Figure 6:
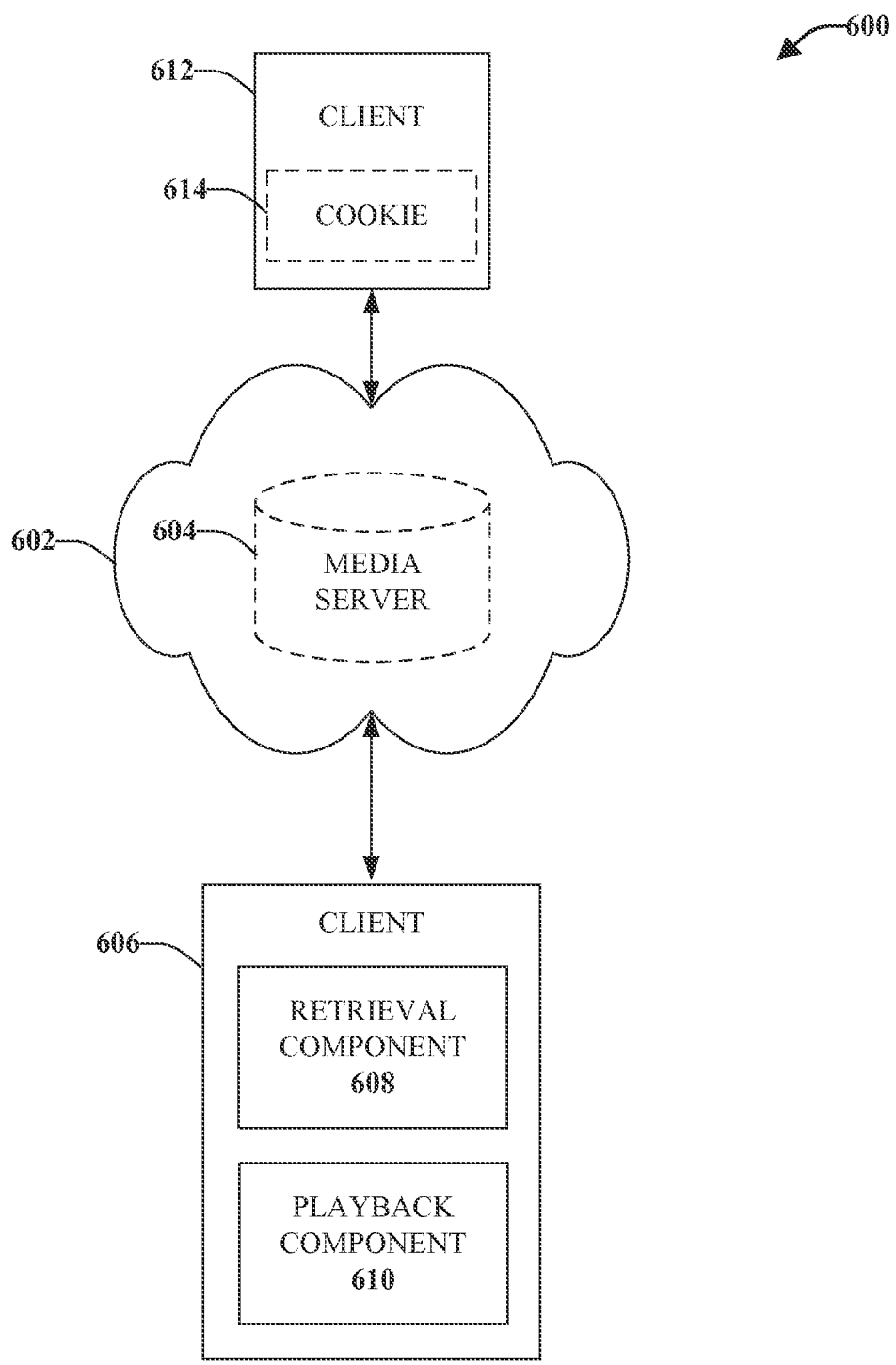
FIG. 6 illustrates a block diagram of an example system that facilitates cross device resumable media consumption in accordance with various aspects and embodiments described herein.

Turning now to FIG. 6 a block diagram of an example system 600 that facilitates cross device resumable media consumption in accordance with various aspects and embodiments described herein is shown. System 600 includes a client device 606 that resumes playback of previously watched media content on client device 612 from a media server 604 via a network 602. The client device 606 includes a retrieval component 608, and a playback component 610.

Retrieval component 608 receives a first playback time position from media server 604, where the first playback time position is based on a media statistics update received by the media server 604. The retrieval component 608 also receives a cookie 614 associated with the account, where the cookie 614 includes information identifying the media content and a second playback time position associated with the account. In some embodiments, the cookie 614 is received from client device 612. In other embodiments, the cookie 614 may be stored on the media server 604 or even client 606 if the client 606 had previously viewed the media content. Cookie 614 can be generated in response to a browser or application shutdown procedure on either client device 606 or client device 612.

In one embodiment, playback component 610 can playback the media content from the playback time position from the cookie or the media statistics update, playing back whichever one has a later position. In another embodiment, playback component 610 can playback the media content at the playback time position that was received most recently.

Figure 7:
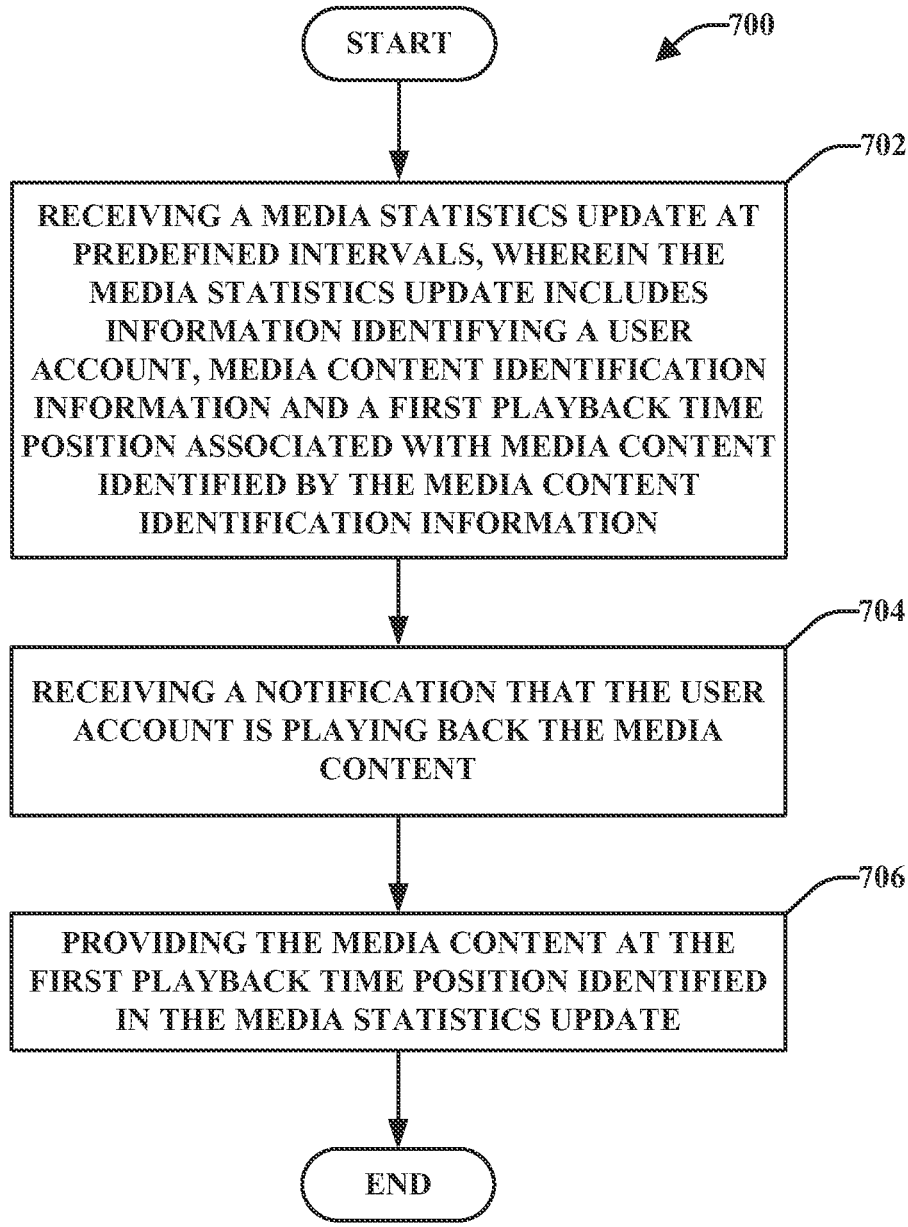
FIG. 7 is a flow diagram of an example method for facilitating cross device resumable media consumption in accordance with various aspects and embodiments described herein.
Figure 8:
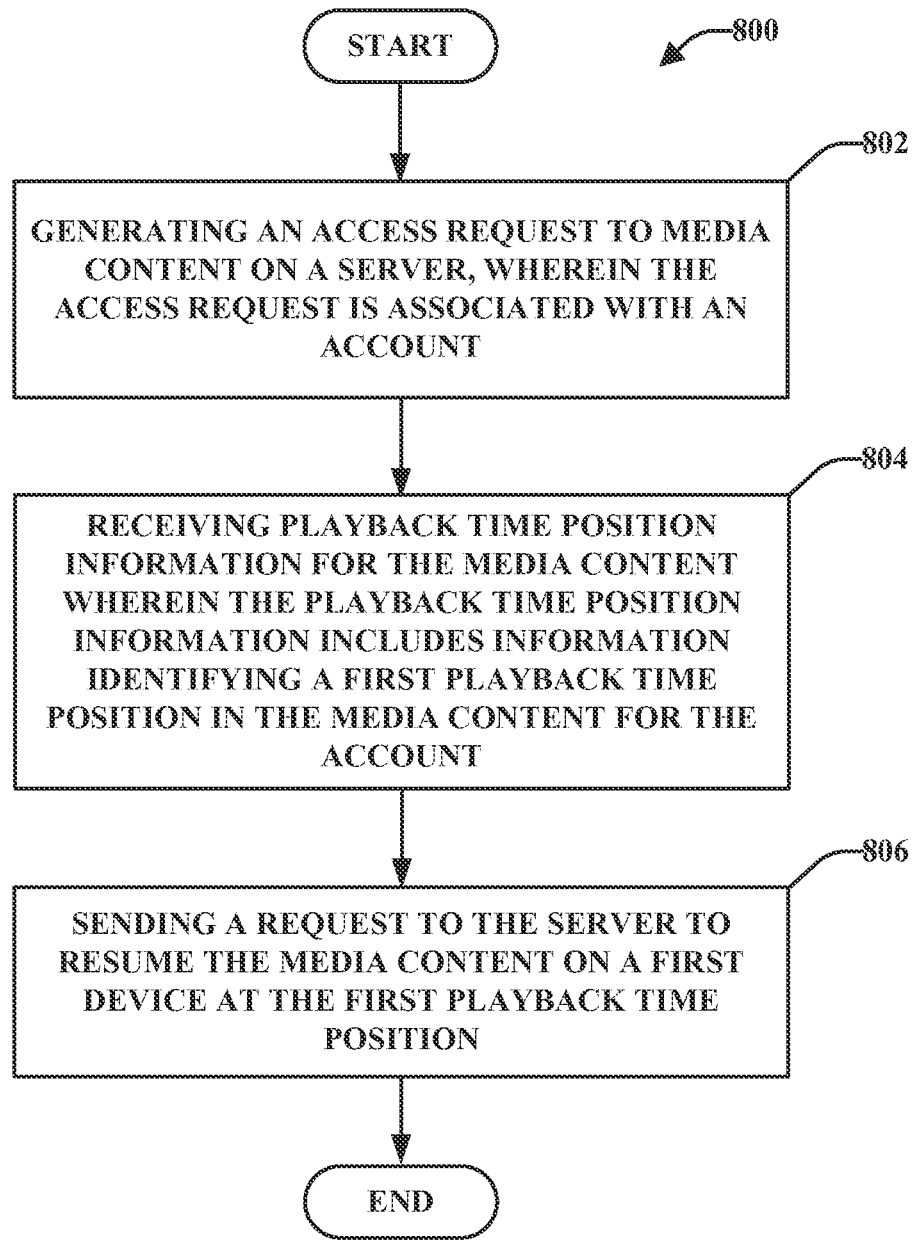
FIG. 8 is a flow diagram of another example method for facilitating cross device resumable media consumption in accordance with various aspects and embodiments described herein.
Figure 9:
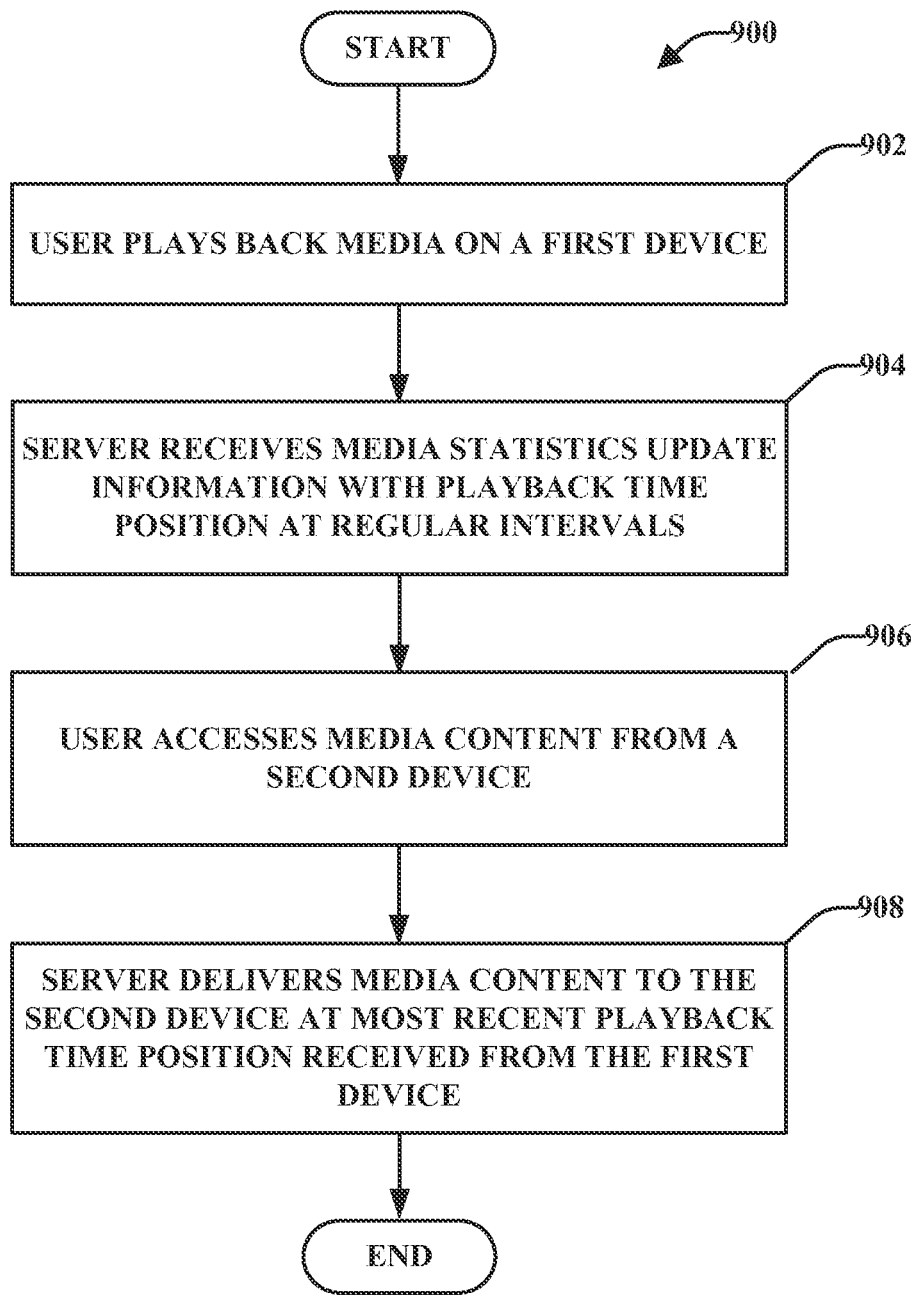
FIG. 9 is a flow diagram of another example method for facilitating cross device resumable media consumption in accordance with various aspects and embodiments described herein.

In view of the example systems/interface described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 is a flow diagram of example method for facilitating cross device resumable media consumption in accordance with various aspects and embodiments described herein. Methodology 700 can begin at step 702, where the method includes receiving a media statistics update (e.g., by update component 212), wherein the media statistics update includes information identifying a user account, media content identification information, and a first playback time position associated with media content identified by the media content identification information.

The media statistics update can be received at predefined intervals (e.g., every 40 seconds). The intervals can be regular intervals, or the intervals can be varied based on a number of factors. The factors can include bandwidth and storage requirements and/or limitations, user preferences associated with the user account, or based on the length of the media content being played back (e.g., shorter media content can have more frequent media statistics updates, while longer media content can have less frequent updates).

The media statistics update can be issued in response to a ping/media statistics update request to a client device, and the client device sends the playback time position and associated identifying information in response to receiving the ping.

At step 704, the method includes receiving a notification that the account is playing back the media content (e.g., by monitoring component 214). The media access request can include information identifying the media content that is being requested as well as information identifying the account that is requesting the media access. In some embodiments, the media access request can include an indicator of whether or not the media has been at least partially played back by the account before. If there is no indication that the media has been accessed before, the media can be played back at the beginning automatically, saving the server from having to search for a last known position.

At step 706, the media content is provided (e.g., by resume component 216) at the first playback time position identified in the media statistics update. In one embodiment, there can be multiple saved playback time positions for the media content and the media content will be played back at the position that is most elapsed from the beginning of the media, regardless of whether the playback time position was saved most recently or not. In another embodiment, the media content will be played back using the playback time position that was most recently received from the account, regardless of whether it's saved position is the most elapsed or not.

Referring now to FIG. 8, a flow diagram of another example method for facilitating cross device resumable media consumption in accordance with various aspects and embodiments described herein is shown. Methodology 800 can begin at step 802, where the method includes generating an access request (e.g., by request component 508) to media content on a server, wherein the access request is associated with an account.

At step 804, a playback time position information for the media content is received (e.g., by retrieval component 510) wherein the playback time position information includes information identifying a first playback time position in the media content for the account. At step 806, a request is sent (e.g., by playback component 512) to the server to resume the media content on a first device at the first playback time position.

In addition to the various embodiments described in this disclosure, it is to be understood that other similar embodiments can be used or modifications and additions can be made to the described embodiment(s) for performing the same or equivalent function of the corresponding embodiment(s) without deviating there from. Accordingly, the invention is not to be limited to any single embodiment, but rather can be construed in breadth, spirit and scope in accordance with the appended claims.

Referring now to FIG. 9, a flow diagram of another example method for facilitating cross device resumable media consumption in accordance with various aspects and embodiments described herein is shown. Methodology 900 can begin at step 902, where the user (e.g., using account 104) plays back media content on a first device (e.g., client device 102). The first device can prepare media statistics updates in response to pings from a server (e.g., 110) and the server can receive these media statistics updates from the first device at 904, where the media statistics updates include information that identifies a last known playback time position for the media content associated with the account. The server can receive these updates at predefined intervals.

At 906, when the server detects that a user accesses the media content from a second device, based on tracking media accesses by the user account, at 908 the server can deliver the media content to the second device at the most recent playback time position received from the first device.

Example Operating Environments

The systems and processes described below can be embodied within hardware, such as a server computer, a personal computer, a mobile phone or tablet, and other consumer electronics capable of streaming and playing back media. Further, the order in which some or all of the process blocks appear in each process should not be deemed limiting. Rather, it should be understood that some of the process blocks can be executed in a variety of orders, not all of which may be explicitly illustrated in this disclosure.

Figure 10:
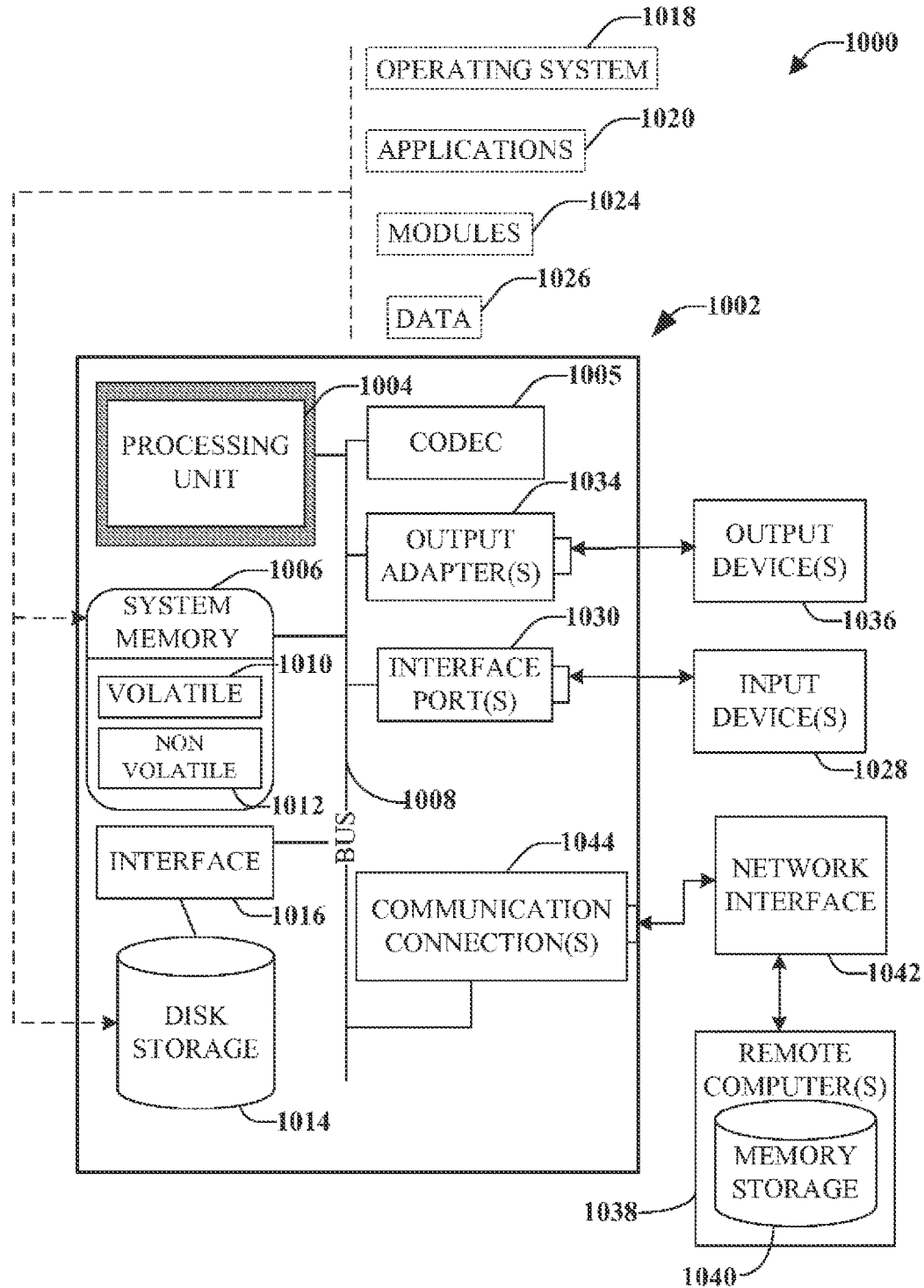
FIG. 10 is a schematic block diagram illustrating a suitable operating environment in accordance with various aspects and embodiments.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s). Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
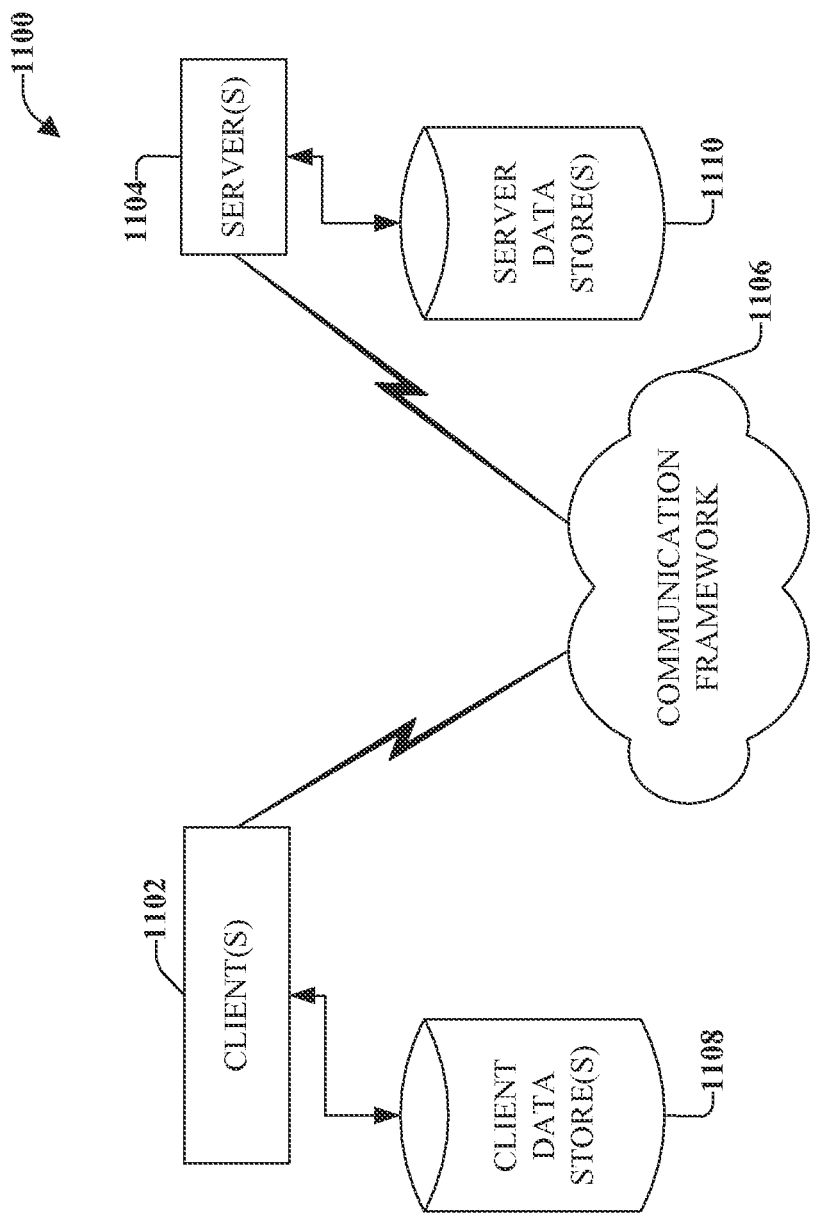
FIG. 11 is a schematic block diagram of a sample-computing environment in accordance with various aspects and embodiments.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A method for media guidance, the method comprising:
   receiving, from a client device during playback of a media content item on the client device, a media content update that includes a user account identifier that is logged in on the client device and first timing information related to the playback of the media content item on the client device at a first time and that is associated with the user account identifier;

receiving, from the client device, second timing information stored by the client device;

updating a playback time position using the first timing information and the second timing information based on which of the first timing information and the second timing information indicates the furthest elapsed playback position;

receiving, at a second time, a request for playback of the media content item on the client device, wherein the client device was not presenting the media content item for at least a portion of time between the first time and the second time; and in response to receiving the request for playback of the media content item on the client device, causing the media content item to be presented on the client device at the playback time position.

2. The method of claim 1, wherein the media content item is a video content item.

3. The method of claim 1, wherein the media content update is transmitted from the client device in response to determining that an application for presenting the media content item that is executing on the client device has been closed.

4. The method of claim 1, wherein the first timing information from the client device includes an indication of the first time.

5. The method of claim 1, wherein the playback time position indicates the furthest elapsed playback position of the media content item across a plurality of client devices including the client device.

6. The method of claim 1, wherein the request for playback of the media content item is received by the client device by a microphone of the client device.

7. The method of claim 1, wherein the media content update and the first timing information included in the media content update are received automatically from the client device at particular time intervals during the playback of the media content item.

8. A system for media guidance, the system comprising:
a hardware processor that is configured to:
receive, from a client device during playback of a media content item on the client device, a media content update that includes a user account identifier that is logged in on the client device and first timing information related to the playback of the media content item on the client device at a first time and that is associated with the user account identifier;

receive second timing information stored by the client device;

update a playback time position using the first timing information and the second timing information based on which of the first timing information and the second timing information indicates the furthest elapsed playback position;

receive, at a second time, a request for playback of the media content item on the client device, wherein the client device was not presenting the media content item for at least a portion of time between the first time and the second time; and in response to receiving the request for playback of the media content item on the client device, cause the media content item to be presented on the client device at the playback time position.

9. The system of claim 8, wherein the media content item is a video content item.

10. The system of claim 8, wherein the media content update is transmitted from the client device in response to determining that an application for presenting the media content item that is executing on the client device has been closed.

11. The system of claim 8, wherein the first timing information from the client device includes an indication of the first time.

12. The system of claim 8, wherein the playback time position indicates the furthest elapsed playback position of the media content item across a plurality of client devices including the client device.

13. The system of claim 8, wherein the request for playback of the media content item is received by the client device by a microphone of the client device.

14. The system of claim 8, wherein the media content update and the first timing information included in the media content update are received automatically from the client device at particular time intervals during the playback of the media content item.

15. A non-transitory computer-readable medium containing computer executable instructions that, when executed by a processor, cause the processor to perform a method for media guidance, the method comprising:
receiving, from a client device during playback of a media content item on the client device, a media content update that includes a user account identifier that is logged in on the client device and first timing information related to the playback of the media content item on the client device at a first time and that is associated with the user account identifier;

receiving, from the client device, second timing information stored by the client device;

updating a playback time position using the first timing information and the second timing information based on which of the first timing information and the second timing information indicates the furthest elapsed playback position;

receiving, at a second time, a request for playback of the media content item on the client device, wherein the client device was not presenting the media content item for at least a portion of time between the first time and the second time; and in response to receiving the request for playback of the media content item on the client device, causing the media content item to be presented on the client device at the playback time position.

16. The non-transitory computer-readable medium of claim 15, wherein the media content item is a video content item.

17. The non-transitory computer-readable medium of claim 15, wherein the media content update is transmitted from the client device in response to determining that an application for presenting the media content item that is executing on the client device has been closed.

18. The non-transitory computer-readable medium of claim 15, wherein the first timing information from the client device includes an indication of the first time.

19. The non-transitory computer-readable medium of claim 15, wherein the playback time position indicates the furthest elapsed playback position of the media content item across a plurality of client devices including the client device.

20. The non-transitory computer-readable medium of claim 15, wherein the request for playback of the media content item is received by the client device by a microphone of the client device.

21. The non-transitory computer-readable medium of claim 15, wherein the media content update and the first timing information included in the media content update are received automatically from the client device at particular time intervals during the playback of the media content item.

\* \* \* \* \*